United States Patent Office 2,973,060
Patented Feb. 28, 1961

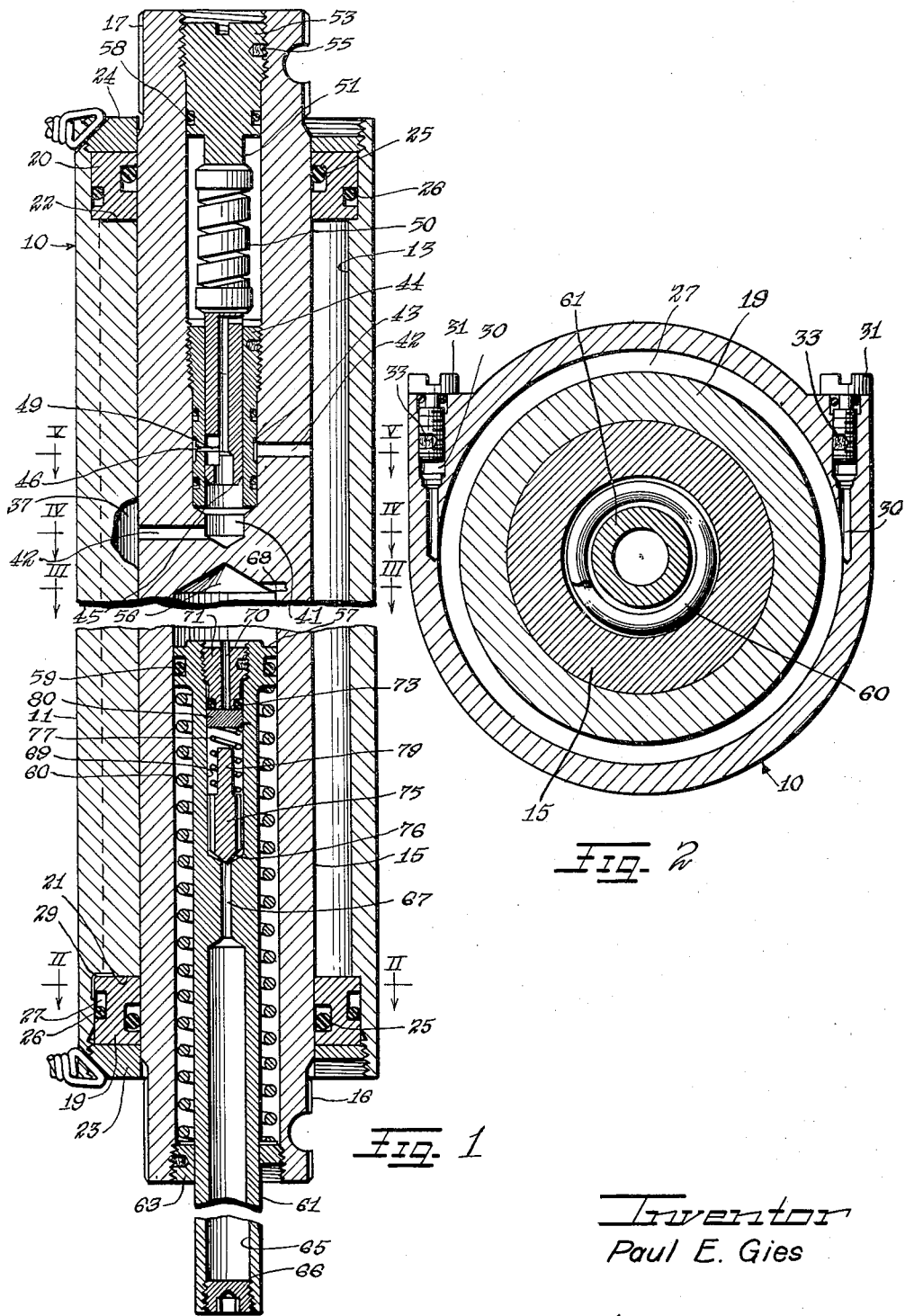

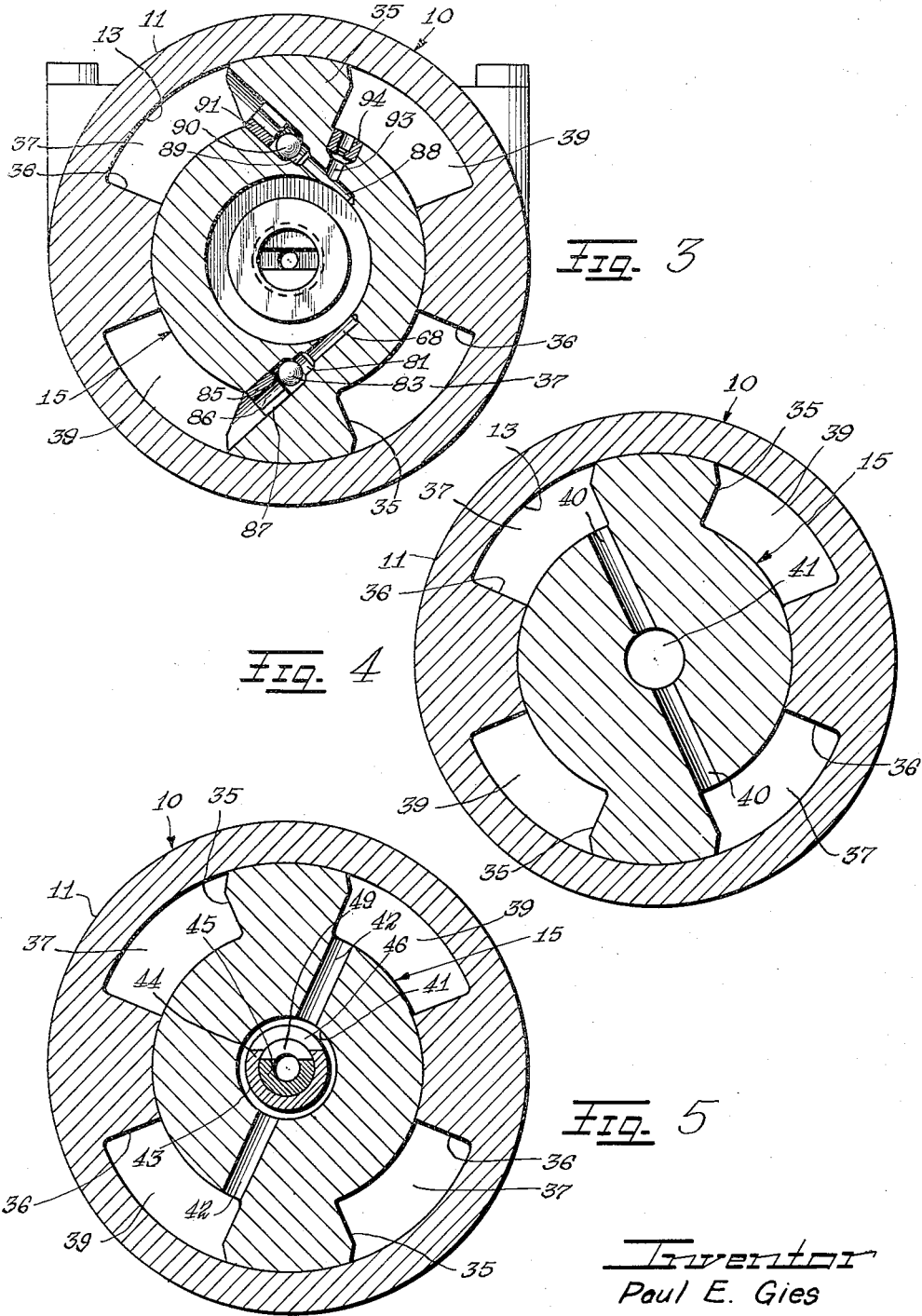

2,973,060

FLUTTER DAMPER

Paul E. Gies, Snyder, N.Y., assignor to Houdaille Industries, Inc., Buffalo, N.Y., a corporation of Michigan Filed Oct. 7, 1957, Ser. No. 688,623

2 Claims. (Cl. 188—93)

This invention relates to improvements in dampers and more particularly relates to dampers adapted to control the flutter of aircraft and the like.

A principal object of the invention is to provide an improved form of damper in which the compactness of the damper is increased by storing replenishing fluid in the damping piston.

Another object of the invention is to provide a new and improved form of rotary damper in which the rotary vane piston of the damper is so arranged as to store replenishing fluid within the piston and thereby eliminate the usual storage chamber contained within the damping housing.

A still further object of the invention is to provide a damper of increased stiffness by extending the shaft of the damper beyond opposite ends of the damper housing and utilizing each end of the shaft as a connecting means, and increasing the compactness of the damper by providing a damping orifice control valve in one end of the piston and a fluid replenishing chamber in the opposite end of the piston.

These and other objects of the invention will appear from time to time as the following specification proceeds and with reference to the accompanying drawings wherein:

Figure 1 is a schematic longitudinal sectional view taken through a rotary damper constructed in accordance with the invention;

Figure 2 is a transverse sectional view taken substantially along line II—II of Figure 1;

Figure 3 is a transverse sectional view taken substantially along line III—III of Figure 1, illustrating the passageways for replenishing fluid from the replenishing chamber to the damping chambers;

Figure 4 is a transverse sectional view taken substantially along line IV—IV of Figure 1, illustrating the fluid displacement passageways between one pair of complemental working chambers; and Figure 5 is a transverse sectional view taken substantially along line V—V of Figure 1 and illustrating the fluid displacement passageways between an opposed pair of complemental working chambers.

In the embodiment of the invention illustrated in the drawings, reference character 10 designates generally a damper of the rotary vane piston type capable of damping the tendency of the air foil assemblies of aircraft to flutter.

The damper 10 is shown as being a rotary vane hydraulic piston type of damper operating on the principle of the absorption of energy by a metered valve control of the displacement of the hydraulic fluid between opposed working chambers of the damper, and permitting intentional movement of the control structure or surface, but resisting vibrational or sudden or rapid movement of the control structure or surface.

The housing 11 has an interior cylindrical wall 13 opening to each end thereof, and has a rotary vane piston 15 rotatably mounted therein, having a shaft portion 16 projecting from one end of said housing and a shaft portion 17 projecting from the opposite end of said housing. The two shaft portions 16 and 17 are adapted to be secured to a stationary part of an airplane, but may as well be secured to a movable control surface, where the housing 11 may be secured to the stationary part.

The shaft portions 16 and 17 are rotatably mounted in removable end plates 19 and 20, respectively. The respective end plates 19 and 20 are retained in engagement with the shouldered portions 21 and 22 of the housing, extending annularly outwardly from the cylindrical wall 13, by retainer nuts 23 and 24, respectively. O-ring seals 25 are provided to seal the respective end plates 19 and 20 to the shaft portions 16 and 17, while O-ring seals 26 are provided to seal said end plates to the interior wall portions of the housing 11.

The end plate 19 has an annular groove 27 opening to the periphery thereof in which the O-ring seal 26 is mounted. An air bleed groove 29 has communication therewith and accommodates the bleeding of air from the damper through the groove 27 and air bleed chambers 30 communicating with said groove and closed by air bleed plugs 31, threaded within the chamber 30 and retained in position as by nylon locking plugs 33.

The rotary vane piston 15 is shown as having diametrically opposed wings or vanes 35 extending radially from the shaft portion thereof, and conforming at their outer ends to and slidably engaging the cylindrical wall 13 of the housing 11, between fluid reaction abutments 36, extending inwardly of the cylindrical wall portion 13 of the housing 11 and having slidable engagement with the cylindrical shaft portion of the rotary vane piston 15, as shown in Figures 3, 4 and 5.

The fluid reaction abutments 36 cooperating with the vanes 35 of the rotary piston 15 divide the damping chamber into a plurality of pairs of complemental opposed working chambers 37 and 39. The working or damping chambers 37 are connected together by fluid displacement passageways 40 having communication with the inner end of a valve chamber 41 and leading radially through the piston from the end of the valve chamber 41 (Figure 4).

The working chambers 39 are connected together by fluid displacement passageways 42, leading radially through the rotary piston 15 and having communication with the valve chamber 41 through an annular groove 43 in a valve sleeve 44, threaded within the valve chamber 41 from the open end of the shaft portion 17 of the rotary piston. The outwardly opening annular groove 43 in turn communicates with the interior of said sleeve, for cooperation with an orifice control valve 45, through a chordal slit 46.

The orifice control valve 45 is herein shown as being a hollow plug type of temperature compensating orifice control valve, varying the cross-sectional area of the chordal slit 46 in accordance with temperature variations and rotatably mounted within the sleeve 44. An orifice slit 49 has communication with the chordal slit 46 and opens to the interior of the valve. Turning of the orifice control valve 45 will thus vary the cross-sectional area of the slit 46 and the energy dissipation of the damping fluid, and the damping strength of the damper.

The valve 45 is shown as being turned within the sleeve 44, to compensate for variations in temperature to which the damper is subjected, by means of a thermostatic coil 50, secured at its inner end to the orifice control valve 45 and at its outer end to the inwardly projecting end portion 51 of an adjustment nut 53, threaded within the shaft 17 from the outer end thereof into the chamber 41, and locked into position therein as by a nylon locking plug 55. The adjustment screw 53 is sealed to the chamber 41 as by an O-ring seal 58.

Referring now in particular to the means for storing and replenishing damping fluid in the damping chamber, the rotary piston 15 is shown as being drilled from the end of the shaft portion 16 to form a fluid replenishing chamber 56, having a replenishing piston 57 mounted therein and sealed to the wall thereof as by an O-ring seal 59. A compression spring 60 encircles a rod 61 of the replenishing piston 57 and is seated at one end on an end closure 63, threaded within the end of the shaft portion 16, and is seated at its opposite end on the piston 57, to bias the piston 57 in extended relation with respect to the replenishing chamber 56, and to feed hydraulic fluid through passageways 68 and 88 to the damping chambers 39 and 37 respectively, as shown in Figure 3. The nut 63 is shown as being threaded within the chamber 56 from the outer end of the shaft portion 16 and as forming a bearing for the piston rod 61, accommodating movement of the piston 56 toward the inner end of the replenishing chamber 56 by the bias of the spring 60, and accommodating movement of the piston 57 against the bias of the spring 60 as the replenishing chamber 56 is filled with hydraulic fluid.

The piston rod 61 and replenishing piston 59 are shown as being axially drilled throughout the length thereof to accommodate hydraulic damping fluid to be introduced in the replenishing chamber 56 through a threaded inlet passageway 65 opening to the outer end of the piston rod 61. The threaded inlet passageway 65 may afford a means for connecting a filling fitting (not shown) to said piston rod 61 when it is desired to fill the replenishing chamber 56 with damping fluid, and is closed by a plug 66 threaded therein, to close said passageway when the damper has been filled with damping fluid and is in operation.

The drilled portion of the piston rod 61 includes a reduced diameter passageway 67, intermediate the ends of the piston rod, and terminating into a check valve chamber 69, opening to the replenishing chamber 56 through a passageway 70 extending along a plug 71, threaded in the piston 57 from the inner end thereof, and sealed to the check valve chamber 69 as by an O-ring 73. A check valve 75 having a conical valve face 76 extending within the passageway 67 and engaging the shoulder between the passageway 67 and the check valve chamber 69 is provided to block the back flow of fluid from the replenishing chamber 56 out through the end of the piston rod 61. The check valve 75 is biased into engagement with its seat as by a spring 77 encircling a stem 79 of said check valve and interposed between said check valve and a filter plug 80, abutting the inner face of the plug 71.

Damping fluid is supplied to the damping chambers 39 through the passageway 68 communicating with an axially aligned check valve chamber 81 having a check valve 83 therein. The check valve 83 is arranged to prevent the backflow of damping fluid from the chambers 39 to the replenishing chamber 56. A retainer plug 85 having a passageway 86 leading therealong and a slot 87 opening to said passageway and extending therealong is provided to retain the check valve 83 in position and accommodate the flow of damping fluid from the check valve chamber to the damping chambers 39.

Fluid is supplied to the damping chambers 37 through a passageway 88 communicating with a check valve chamber 89 having a check valve 90 therein, and retained in position as by a slotted retainer plug 91 threaded within the check valve chamber from the outside thereof. A bleeder passageway 93 is shown as leading from the passageway 88 and as having a bleeder plug 94 threaded therein.

It may be seen from the foregoing that I have provided a compact form of damper in which the stiffness of the damper is increased by extending the shaft of the rotary damping position from opposite ends of the damper housing and connecting the stationary or movable part thereto, and that the compactness of the damper is attained by eliminating the usual replenishing chamber within the damper housing and instead utilizing the interior of the rotary damping piston as a replenishing chamber.

While I have herein shown and described one form in which my invention may be embodied, it should be understood that various modifications and variations thereof may be effected without departing from the spirit and scope of the novel concepts thereof.

I claim as my invention:

1. A rotary damper particularly adapted to damp flutter of a vibrating member relative to a stationary member, comprising a housing having an interior cylindrical wall defining a damping chamber, a rotary piston within said damping chamber and having vanes having slidable engagement with the wall thereof, fluid reaction abutments extending inwardly from said cylindrical wall into slidable engagement with said rotary piston and with said vanes defining a plurality of complemental and opposed working chambers, said rotary piston having shaft portions extending from opposite ends thereof and rotatably mounted in the ends of said housing and having end portions extending beyond opposite ends of said housing, each of said end portions of said shaft portions being fixedly connected to one of said members, a valve chamber within said piston opening through one of said shaft portions and having fluid communication with said damping chambers, an energy absorbing orifice control valve in said valve chamber affording fluid resisted movement from one set of said working chambers to the other upon the tendency of said piston to rotate relatively to said chamber, a damping fluid replenishing chamber within said piston and opening to the end of the other of said shaft portions and having fluid communication with said damping chambers, a replenishing piston within said replenishing chamber biased to maintain pressure on the damping fluid within said replenishing chamber, said replenishing piston having a hollow rod portion extending outwardly beyond the end of the shaft portion having said replenishing chamber opening to the end thereof, said hollow rod portion accommodating the filling of said replenishing chamber from the end of the associated shaft portion, and check valve means in said rod portion maintaining pressure within said replenishing chamber.

2. A rotary damper in accordance with claim 1 wherein a spring encircles the hollow rod portion and biases the replenishing piston linearly to maintain pressure on the damping fluid within said replenishing chamber, wherein spring means are provided within said hollow rod portion to bias said check valve in position to maintain fluid under pressure within said replenishing chamber, wherein removable closure means are provided for the end of said hollow rod portion to accommodate the filling of said replenishing chamber through the hollow interior of said rod portion, and wherein opposite end portions of said shaft portions have integral formations thereon to fixedly connect one of said members with each of said shaft portions.

References Cited in the file of this patent

UNITED STATES PATENTS

| | | |
|---|---|---|
| 1,825,233 | Joyce | Sept. 29, 1931 |
| 1,918,574 | Tibbets | July 18, 1933 |
| 2,559,047 | Porter et al. | July 3, 1951 |
| 2,811,227 | O'Connor | Oct. 29, 1957 |
| 2,814,362 | Sweeney | Nov. 26, 1957 |
| 2,819,064 | Peras | Jan. 7, 1958 |